United States Patent [19]

Nomura

[11] 4,428,613
[45] Jan. 31, 1984

[54] PARKING BRAKE CABLE OF AUTOMOBILE

[75] Inventor: Yoshihisa Nomura, Toyota, Japan

[73] Assignee: Toyota Jidosha Kogyo Kabushiki Kaisha, Toyota, Japan

[21] Appl. No.: 277,007

[22] Filed: Jun. 24, 1981

[30] Foreign Application Priority Data

Aug. 8, 1980 [JP] Japan ............................ 55-111665[U]

[51] Int. Cl.³ ............................................. B62D 27/00
[52] U.S. Cl. ....................................... 296/208; 74/533
[58] Field of Search ................... 296/208; 74/533, 534, 74/534.5; 254/389; 242/157 R

[56] References Cited

U.S. PATENT DOCUMENTS 3,216,276 11/1965 Nagy ...................................... 74/534
3,234,812  2/1966 Fodrea .................................... 74/534
3,494,657  2/1970 Tantlinger ............................ 296/208

Primary Examiner—Joseph F. Peters, Jr.
Assistant Examiner—John A. Carroll
Attorney, Agent, or Firm—Parkhurst & Oliff

[57] ABSTRACT

An arrangement of braking cables of a parking brake system of automobile in which a pair of parking brake cables are connected at their one ends to an equalizer which in turn is connected through a wire to a parking brake lever, while the other ends of the parking brake cables are extended through a floor tunnel and are supported by shelves of different heights formed on a cable supporting bracket disposed at the outlet side of the floor tunnel. The parking brakes are slidably guided by and curved along the shelves at a large radius of curvature to extend toward respective rear wheel brakes in a crossing manner but without interfering with each other. Thanks to the large radius of curvature, the cables can operate at a high operation efficiency and can have an improved durability to make an efficient transmission of force to the rear wheel brakes. In consequence, it is allowed to reduce the cross-sectional area of the floor tunnel to preserve a large flat floor space, while permitting the fuel tank to have a large capacity and be located as close as possible to the outlet of the floor tunnel.

4 Claims, 7 Drawing Figures

PARKING BRAKE CABLE OF AUTOMOBILE

BACKGROUND OF THE INVENTION

1. Field of the Invention

The present invention relates to a technique for laying a parking brake cable on automobile, between a floor tunnel and rear wheels.

2. Description of the Prior Art

Automobiles are provided with parking brake systems for preventing them from moving unintentionally during parking thereby to ensure the safety.

FIG. 1 generally shows the construction of a typical conventional parking brake system. This parking brake system includes parking brake cables 7,7 connected through a bracket 6 to an equalizer 5 which in turn is connected through a wire 4 to a parking brake lever 3 disposed at the front side of a floor tunnel 2 provided to protrude from the central portion of the floor 1 of the automobile chassis. These parking brake cables 7,7' are derived from the outlet 2' of the floor tunnel and are turned laterally away from each other through large curvatures R,R' so as to be connected to respective rear wheel brakes 8,8'.

An exhaust pipe 9 also is laid in the floor tunnel 2 and is bent from the outlet 2' so as to be connected to a muffler 10. A fuel tank 12 is mounted beneath the rear seat 11.

Various improvements have been achieved as the safety measures for automobiles. In the case of the fuel tank, it is a current measure to locate the fuel tank as remote as possible from the rear end of the automobile, to diminish the damage in the event of a rear end collision. On the other hand, there is a demand for long distance touring which in turn requires an increased capacity of the fuel tank. To meet these demands, in modern automobiles, the fuel tank 12 is located in the vicinity of the floor tunnel outlet 2'.

An increased size of the floor tunnel 2 reduces the foot space beneath the rear seat 11 to deteriorate the comfortableness, and the fit of the carpet is failed to degrade the appearance. Therefore, the floor tunnel preferably has a reduced size.

If these demands are to be satisfied simultaneously, the curvature R,R' of the parking brake cables 7,7' at the floor tunnel outlet 2' are to be decreased extremely, resulting in a deteriorated operating efficiency of the cable. This in turn leads to a deterioration in the durability of the cable, as well as increased frequency or demand for the renewal of the cables. The renewal requires a troublesome work and expensive.

To avoid these problems, it has been a common measure to preserve a large curvature of the parking brake cables at a cost of increased size of the floor tunnel outlet 2' and reduced size of the fuel tank 12.

SUMMARY OF THE INVENTION

Accordingly, an object of the invention is to overcome the above-described problems of the prior art by providing an improved construction of parking brake cables of automobiles.

Another object of the invention is to provide a parking brake system in which a pair of parking brake cables are arranged to cross each other at the floor tunnel outlet so as to be able to be connected to the rear wheel brakes at large curvatures.

Still another object of the invention is to provide an arrangement of the parking brake cables of automobile which permits the size of the floor tunnel to be reduced and a fuel tank of large capacity to be positioned as remote as possible from the rear end of the automobile.

To these ends, according to the invention, there is provided an arrangement of parking brake cables of automobile, in which a pair of parking brakes are connected at their one ends to an equalizer which in turn is connected through a wire to a parking brake lever, while the other ends of the parking brake cables are extended rearwardly through a floor tunnel so as to be connected to respective rear wheel brakes through large curvatures at the floor tunnel outlet, wherein the improvement comprises that the pair of parking brake cables are slidably supported by respective stages of shelves of a supporting bracket disposed at the floor tunnel outlet and curved to respective opposite sides at a large radius of curvatures so as to be connected to the rear wheel brakes of opposite sides.

DESCRIPTION OF THE PREFERRED EMBODIMENT

Figure 1:
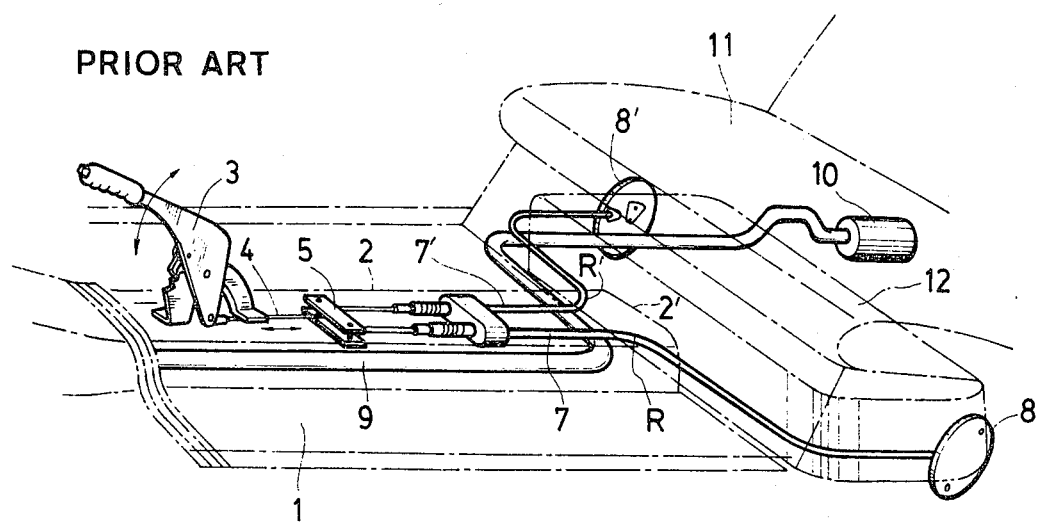
FIG. 1 is a schematic illustration of a typical conventional arrangement of parking brake cables in accordance with the invention.
Figure 2:
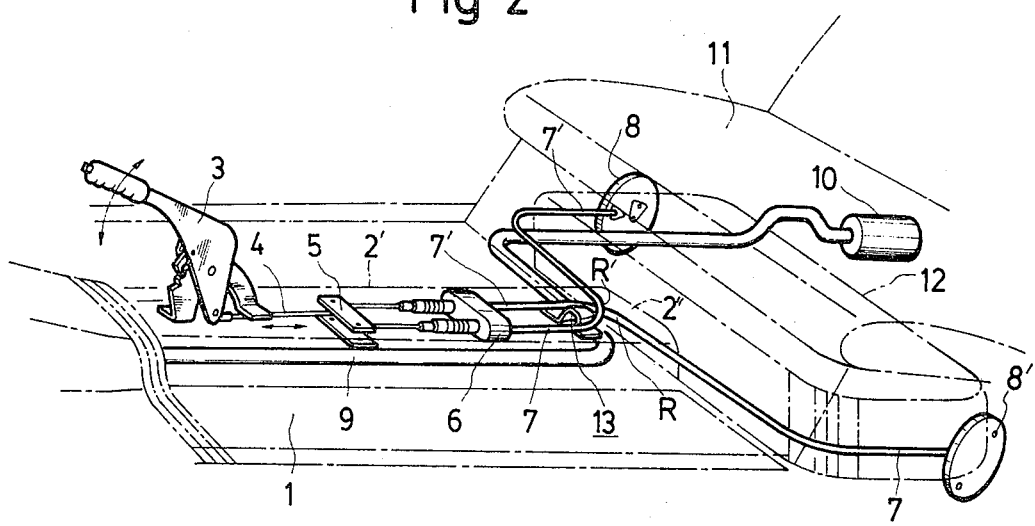
FIG. 2 is a schematic illustration of the whole part of the parking brake system in accordance with the invention.

Referring to the drawings, a reference numeral 1 designates a floor of chassis of an automobile, at the center of which provided is a floor tunnel 2' extending in the longitudinal axis of the automobile. The floor tunnel 2' is designed to have a size smaller than that of the conventional one. A manually operable parking brake lever 3 is provided at the upper side of the floor tunnel 2' adjacent to the driver's seat in the same manner as the conventional parking brake.

An equalizer 5 which is known per se is connected through a wire 4 to the lower end of the parking brake lever 3. As in the case of the conventional system, a pair of parking brake cables 7,7' are extended through a bracket 6 and then through the floor tunnel 2' rearwardly so as to be connected to respective rear wheel brakes 8,8'.

An exhaust pipe 9 is also extended along the floor tunnel 2' and is connected to a muffler 10 bypassing a fuel tank 12 beneath the rear seat 11.

Figure 3:
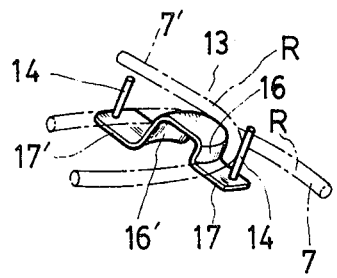
FIG. 3 is a perspective view of a supporting bracket.
Figure 4:
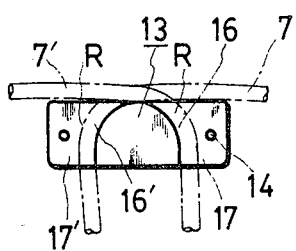
FIG. 4 is a plan view of the supporting bracket as shown in FIG. 3.
Figure 5:
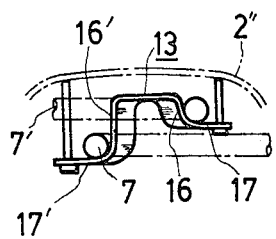
FIG. 5 is a front elevational view illustrating the supporting bracket shown in FIG. 3.
Figure 6:
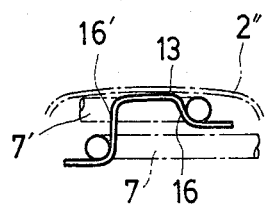
FIG. 6 is an illustration of a modification of the supporting bracket, corresponding to the view shown in FIG. 5.
Figure 7:
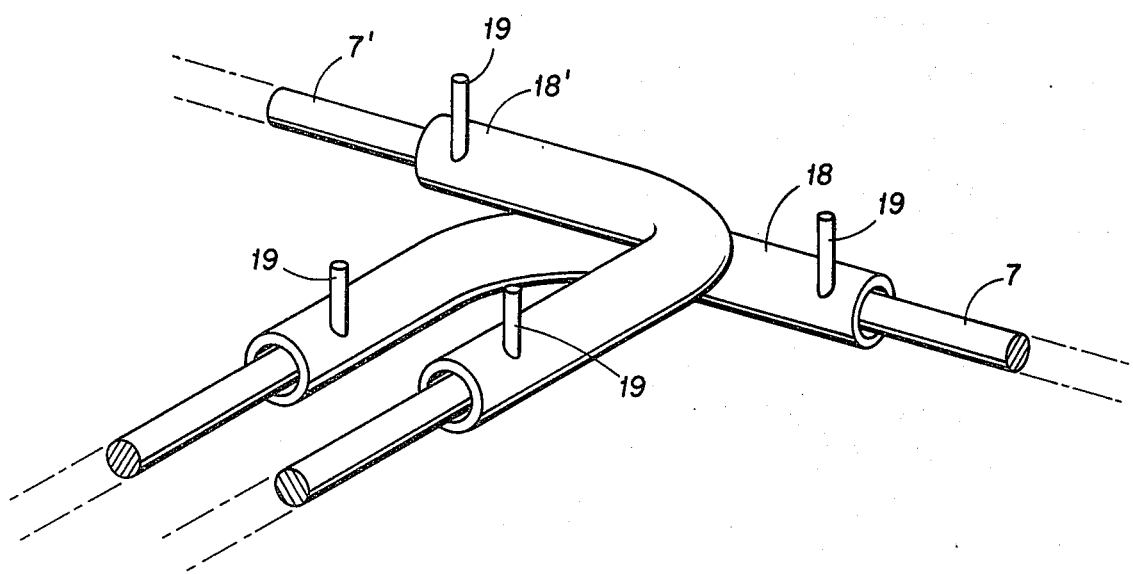
FIG. 7 is a perspective view of air altenative embodiment illustrating a guide-pipe type supporting member.

A cable supporting bracket 13 for slidably supporting the parking brake cables 7,7' is fixed by stud bolts 14,14 to the floor tunnel 2' at a portion of the latter near the tunnel outlet 2", as will be understood from FIGS. 3,4 and 5. The supporting bracket 13 is provided with left and right shelves 17,17' arranged in a pair and at different levels, having side surfaces 16,16' curved at a predetermined curvature. As will be seen from the drawings, the parking brake cables 7,7' engage respective shelves 17,17' and are extended toward respective opposite sides while being guided by the side surfaces 16,16', i.e. in such a manner to cross each other without interfering with each other, so as to be connected to the rear wheel brakes 8,8'.

Therefore, the portions of the parking brake cables extended rearwardly from the supporting bracket 13 are curved at a sufficiently large radius of curvature R,R'.

Therefore, in spite that the parking brake cables 7,7' are curved at large radius of curvature, the cross-section of the floor tunnel 2' can effectively be utilized because the curvature starts at the outlet 2" of the floor tunnel 2'. This advantageously permits the cross-section of the floor tunnel 2' to be reduced, so that it is possible to position the fuel tank 12 as close as possible to the floor tunnel outlet 2" while permitting the fuel tank 12 to have a large capacity.

In operation, as the parking brake is tightened or loosened through the manipulation of the parking brake lever 3, the parking brake cables 7,7' are pulled ahead or aback through the wire 4 and the equalizer 5. In the parking brake system of the invention, since the parking brake cables 7,7' are curved toward opposite sides crossing each other making large radius of curvature R,R', the cables 7,7' can operate without any extra force applied to the parking brake cables 7,7', to ensure the expected operation to be performed for providing the desired braking effort. Needless to say, the durability is much superior to that of the conventional parking brake.

The above-described embodiment is not exclusive and various changes and modifications are possible. For instance, instead of a single piece of supporting bracket having shelves of different height, it is possible to use two different pieces of brackets having shelves of different heights. Alternatively, the supporting bracket may be substituted by a guide-pipe type supporting member 17, 18', 19.

Also, the invention is applicable not only to the described hand-operated lever type brake but also to a parking brake adapted to be put into effect by depression of a foot pedal.

The bracket 13 may be directly attached to the portion of the floor tunnel 2' near the outlet 2" by spot welding so as to be suspended from the tunnel 2'.

As has been described, according to the invention, there is provided an arrangement of parking brake cables of automobile, in which a pair of parking brake cables are connected at their one ends to an equalizer which in turn is connected through a wire to a parking brake lever, while the other ends of the parking brake cable are extended through a floor tunnel and curved at the outlet of the floor tunnel so as to be connected to the rear wheel brakes, wherein the improvement comprises that the parking brake cables are slidably supported by respective shelves of a cable supporting bracket having shelves of different heights and are curved laterally toward respective opposite sides to cross each other. It is, therefore, possible to preserve sufficient radius of curvature of the parking brake cables at the outlet of the floor tunnel, which in turn permits the cross-section of the floor tunnel to be reduced correspondingly. In consequence, it is possible to increase the flat area of the floor and to preserve a sufficiently broad foot space for rear seat to improve the comfortableness.

In addition, since the shelves of the parking brakes are provided at different heights, the mutual interference between the parking brakes is avoided to obviate the wear of the cables which may otherwise, be cau... due to frictional contact between two cables. This i.. turn avoids in combination with the large radius of curvature of the cables, application of unreasonable force to the cables to diminish the damage of the latter while improving the durability. The life of the cables is prolonged also by the reduced thermal influence imposed by the exhaust pipe.

Furthermore, since the parking brake cables are bent at a large radius of curvature even within the cross-section of the floor tunnel outlet, it is possible to position the fuel tank much closer to the floor tunnel outlet. This is quite advantageous in reducing the damage in case of a rear end collision and increasing the tank capacity to ensure a long running distance of the automobile.

In addition, the arrangement of the parking brake cables of the invention can be achieved without substantial difficulty and increase of cost, because it is attained materially by providing a supporting bracket having shelves of different heights.

What we claim is:

1. In a parking brake system of an automotive vehicle having first and second parking brake cables each connected at one end thereof to an equalizer which in turn is connected to a parking brake lever, and the other end of each of said cables extends rearwardly through a floor tunnel and cruves laterally at the outlet of said floor tunnel so as to be connected to respective rear wheel brakes, a cable supporting bracket device comprising
   a first substantially vertical side wall and first substantially horizontal shelf on one side thereof for supporting and guiding said first cable therearound and thereon,
   a second substantially vertical side wall and second substantially horizontal shelf on the other side thereof for supporting and guiding said second cable therearound and thereon,
said first side wall being arcuate over approximately 90° from one forward end which extends substantially parallel to the vehicle axis, and then curves inwardly in a direction toward said second side wall and terminates at its rear end which extends in a direction substantially transverse to the vehicle axis,
said first shelf extending substantially horizontally outwardly at a first elevation from the lower end of said first side wall,
said second side wall being arcuate over approximately 90° from one forward end which extends substantially parallel to the vehicle axis and then curves inwardly in a direction toward said first side wall and terminates at its rear end in a direction substantially transverse to the vehicle axis, and
said second shelf extending substantially horizontally outwardly at a second elevation, lower than said first elevation by at least the diameter of said second cable, from the lower end of said second side wall.

2. In a parking brake system as claimed in claim 1, wherein said cable supporting bracket device comprises only one integral bracket.

3. In a parking brake system as claimed in claim 1, wherein said cable supporting bracket device comprises separate first and second brackets, said first bracket comprising said first side wall and said first shelf, and said second bracket comprising said second side wall and said second shelf.

4. In a parking brake system of an automotive vehicle having first and second parking brake cables each connected at one end thereof to an equalizer which in turn is connected to a parking brake lever, and the other end of each of said cables extends rearwardly through a floor tunnel and curves laterally at the outlet of said floor tunnel so as to be connected to respective rear wheel brakes, a first substantially horizontally extending cable guiding pipe for supporting and guiding said first cable, a second substantially horizontally extending cable guiding pipe for supporting and guiding said second cable, said second pipe being below said first pipe, said first pipe being arcuate over approximately 90° and extends from one forward end which extends substantially parallel to the vehicle axis, and then curves inwardly in a direction toward said second pipe so as to cross over said second pipe and terminates at its rear end which extends in a direction transverse to the vehicle axis; and said second pipe being arcuate over approximately 90° and extends from one forward end which extends substantially parallel to the vehicle axis, and then curves inwardly in a direction toward said first pipe so as to cross below said first pipe and terminates at its rear end which extends in a direction transverse to the vehicle axis.

* * * * *